US008498786B2

(12) United States Patent
Anderson

(10) Patent No.: US 8,498,786 B2
(45) Date of Patent: *Jul. 30, 2013

(54) MATERIAL IDENTIFICATION SYSTEM

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/904,542

(22) Filed: Oct. 14, 2010

(65) Prior Publication Data

US 2012/0095652 A1    Apr. 19, 2012

(51) Int. Cl.
*G01B 11/10*    (2006.01)

(52) U.S. Cl.
USPC .............................. 701/50; 111/100

(58) Field of Classification Search
USPC ............ 701/26, 50; 356/3.09, 29; 56/10.2 R, 56/10.2 J; 700/250, 253; 342/357.21, 357.2, 342/357.34; 348/118, 120, 169; 111/100, 111/130; 172/5, 8, 10
See application file for complete search history.

(56) References Cited

U.S. PATENT DOCUMENTS

| | | | |
|---|---|---|---|
| RE34,080 E | 9/1992 | Schmidt | |
| 5,870,303 A * | 2/1999 | Trovato et al. | 700/61 |
| 6,314,348 B1 | 11/2001 | Winslow | |
| 6,434,462 B1 | 8/2002 | Bevly et al. | |
| 7,054,731 B1 | 5/2006 | Lange et al. | |
| 7,164,118 B2 * | 1/2007 | Anderson et al. | 250/221 |
| 7,299,056 B2 | 11/2007 | Anderson | |
| 7,299,057 B2 | 11/2007 | Anderson | |
| 7,313,404 B2 | 12/2007 | Anderson | |
| 7,460,942 B2 | 12/2008 | Mailer | |
| 7,668,621 B2 * | 2/2010 | Bruemmer | 700/245 |
| 8,139,109 B2 | 3/2012 | Schmiedel et al. | |
| 2005/0088643 A1 | 4/2005 | Anderson | |
| 2008/0046130 A1 | 2/2008 | Faivre et al. | |
| 2008/0172163 A1 | 7/2008 | Englert et al. | |
| 2009/0076674 A1 * | 3/2009 | Kiegerl et al. | 701/26 |
| 2009/0198425 A1 | 8/2009 | Englert | |
| 2011/0106422 A1 | 5/2011 | Gould et al. | |

OTHER PUBLICATIONS

U.S. Appl. No. 12/943,501, filed Nov. 10, 2010, Clair et al.

* cited by examiner

*Primary Examiner* — Dalena Tran
(74) *Attorney, Agent, or Firm* — Yee & Associates, P.C.

(57) ABSTRACT

A method and apparatus for managing undesired material in an area. A sensor system monitors the area for the undesired material. A number of operations is performed on the area using a vehicle system. The vehicle system comprises a vehicle and a structure connected to the vehicle. A computer system receives data for the area from the sensor system. The computer system identifies a presence of the undesired material along a number of paths in the area using the data to form an identification. The computer system initiates removal of the undesired material based on the identification.

47 Claims, 12 Drawing Sheets

MATERIAL IDENTIFICATION SYSTEM

CROSS-REFERENCE TO RELATED APPLICATION

This application is related to the following patent application: entitled "Vehicle Guidance System", Ser. No. 12/943,501, filed Nov. 10, 2010, assigned to the same assignee, and incorporated herein by reference.

FIELD OF THE INVENTION

The present disclosure is related generally to managing operations, and in particular, to managing operations being performed by a vehicle system. More specifically, the present disclosure relates to a method and an apparatus for managing the operations of a vehicle system in an area with undesired material.

BACKGROUND OF THE INVENTION

Farming operations may include, for example, without limitation, tilling, sowing, plowing, and/or other suitable farming operations. Different types of equipment are used to perform these types of farming operations. The different types of equipment may include, for example, without limitation, planters, tillage equipment, construction scrapers, and/or ganged reel mowers. Typically, a vehicle, such as a tractor is connected to these different types of equipment. The tractor is used to move the equipment across an area, such as a field.

While performing farming operations, the equipment attached to the vehicle may shift relative to the vehicle during the operations. This shift may be undesired and unintended. For example, the vehicle may be moving along a hill. As the vehicle moves along the hill, the equipment attached to the vehicle may lose traction and begin to shift down the hill.

Currently available solutions for controlling the movement of the equipment include using a global positioning system unit to identify movement of the equipment relative to the vehicle. Multiple global positioning system units may be placed on the vehicle and/or on the equipment.

Further, a human operator of the vehicle may adjust the steering of the vehicle to reduce a shift or movement of the structure. Once movement in the structure is identified, an operator may turn the vehicle to reduce the shift in the structure.

Additionally, during farming operations, undesired material may accumulate in the field or near the equipment. Undesired material may include, for example, trash build-up. Trash build-up is the accumulation of vegetation and/or other materials in a field. Trash build-up may interfere with the farming operations performed by the equipment. Additionally, trash-build up may cause the equipment to shift in orientation. The material itself may be desirable, but its accumulation in a particular way or in a particular location may not be. For example, crop residue has benefits such as returning nutrients to the soil and helping conserve the soil from wind and water erosion. However, when crop residue accumulates on the field or near the equipment, it can become undesired material.

Currently, a human operator visually monitors for trash build-up. If the trash build-up does interfere with farming operations, the operator may manually remove the trash build-up. In other words, the operator may stop the vehicle and physically remove the trash.

SUMMARY

An embodiment of the present invention provides a method for managing undesired material in an area. A sensor system monitors the area for the undesired material. A number of operations is performed on the area using a vehicle system. The vehicle system comprises a vehicle and a structure connected to the vehicle. A computer system receives data for the area from the sensor system. The computer system identifies a presence of the undesired material along a number of paths in the area using the data to form an identification. The computer system initiates removal of the undesired material based on the identification.

An embodiment of the present invention provides an apparatus comprising a sensor system, a computer system, and a removal member. The sensor system is configured to monitor an area for undesired material. A vehicle system performs a number of operations on the area. The vehicle system comprises a vehicle and a structure connected to the vehicle. The computer system is configured to receive data for the area from the sensor system. The computer system is configured to identify a presence of the undesired material along a number of paths in the area using the data to form an identification. The removal member is connected to the structure. The computer system initiates removal of the undesired material based on the identification.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION

Figure 1:
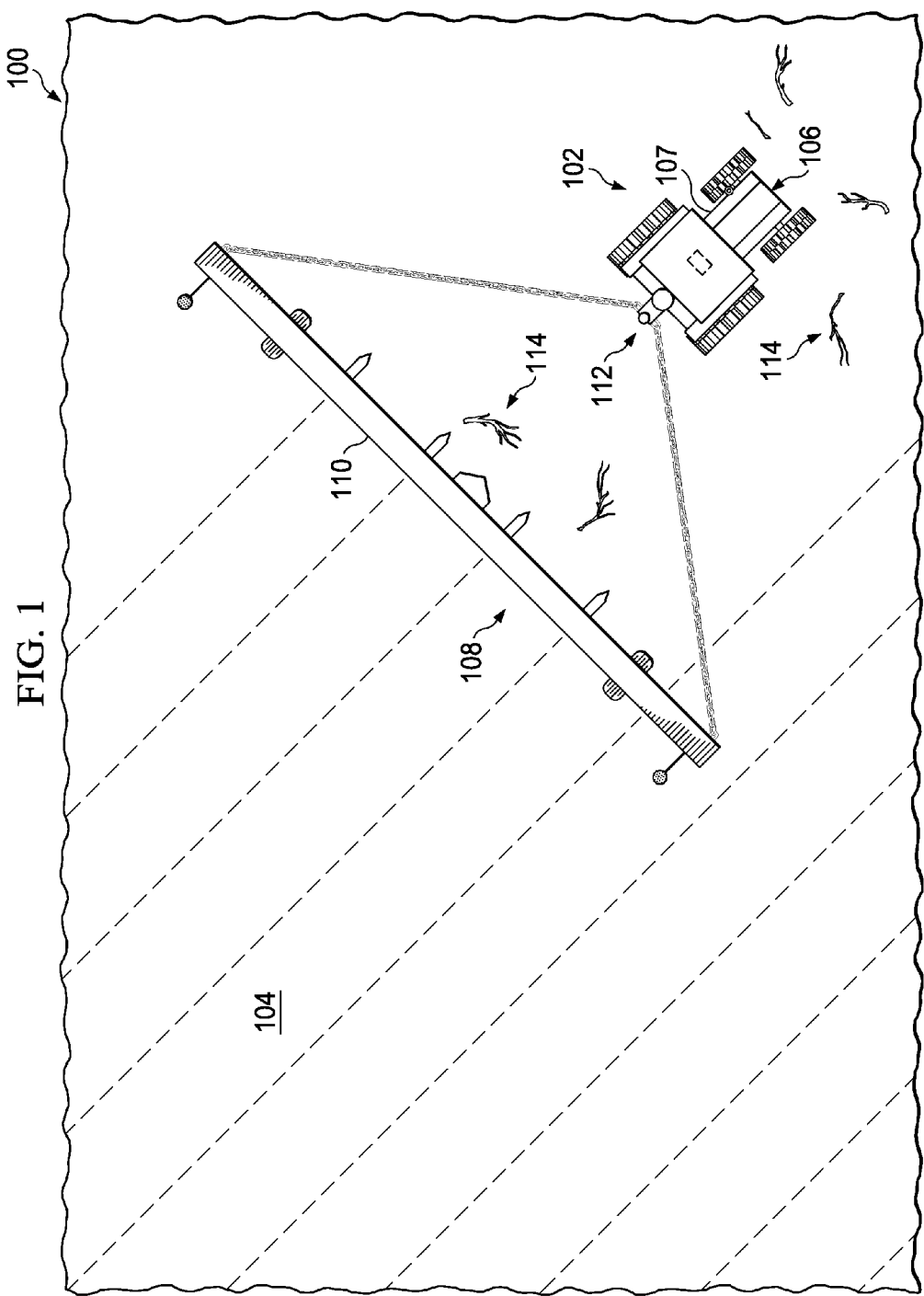
FIG. 1 is an illustration of a vehicle system management environment depicted in accordance with an illustrative embodiment.

With reference now to FIG. 1, an illustration of a vehicle system management environment is depicted in accordance with an illustrative embodiment. In this illustrative example, vehicle system management environment 100 is an example of an environment in which vehicle system 102 may be managed.

As depicted, vehicle system 102 performs operations on field 104. In these illustrative examples, vehicle system 102 may perform operations on field 104 such as, for example, without limitation, tilling, plowing, planting, seeding, and/or other suitable operations.

As illustrated, vehicle system 102 includes vehicle 106 and structure 108 connected to vehicle 106. Vehicle 106 is tractor 107 in this example. Structure 108, in this example, takes the form of tilling system 110 configured to perform tilling operations on field 104. Of course, in other illustrative examples, structure 108 may take the form of some other suitable system configured to perform other types of operations on field 104.

In this depicted example, sensor system 112 is associated with vehicle 106. As used herein, a first component, such as sensor system 112, may considered to be associated with a second component, such as vehicle 106, by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

Sensor system 112 may include any number of sensors configured to generate data about structure 108. This data may be used to identify an orientation of structure 108 relative to vehicle 106. For example, the data may be used to identify when structure 108 is skidding on field 104, moving in an undesired manner relative to vehicle 106, and/or in an undesired orientation relative to vehicle 106.

Additionally, this data may be used to identify undesired material 114 on field 104. Undesired material 114 is material that may interfere with the operations being performed by vehicle system 102. For example, the undesired material may be, without limitation, weeds, grass clippings, stalks, leaves, plastic, irrigation drip tape, twine, dirt, rocks, branches, trash, and/or other objects that are undesired.

The different illustrative embodiments recognize and take into account a number of different considerations. For example, the different illustrative embodiments recognize that during farming operations, vehicles may pull different equipment. During farming operations, the equipment may move relative to the towing vehicle, such as a tractor. The movement may be undesired. For example, if the tractor is pulling the equipment across a hill. The hill may cause the equipment to begin to slide down the hill. The operator may have to steer the tractor in a manner to stop the equipment from sliding. Alternatively, the operator of the tractor may stop the tractor and equipment.

The different illustrative embodiments also recognize and take into account that the wider the equipment, the more noticeable and difficult a slide becomes. For example, a 40 foot wide piece of equipment will be more difficult to control with a 10 degree slide than a 20 foot wide piece of equipment.

The different illustrative embodiments also recognize and take into account that vehicles are becoming autonomous. When a vehicle is autonomous, there is not an operator to notice the equipment sliding. Without an operator, there is no corrective action taken to prevent the sliding. There is also a need to automatically detect undesired material which can negatively affect equipment operation and then take corrective action.

In some current systems, a global positioning system is used to determine a position of the piece of equipment. However, global positioning systems are subject to a number of drawbacks. For example, the satellite signal may be interrupted, the signal may be attenuated due to vegetation in the field, the signal may be corrupted by interference to the satellite transmission, or a receiver component may fail.

The different illustrative embodiments also recognize and take into account that material may build up in the field during farming operations. For example, material may be trash build-up that is the accumulation of vegetation or other materials around ground engaging members of powered vehicles or towed implements. Operations that may result in trash build-up may be, but are not limited to, tractors pulling tillage tools, tractors pulling planters and seeders, as well as pushed powered soil cultivators.

The different illustrative embodiments also recognize and take into account that an effect of trash build up is that balls of material can accumulate and then become free and be located somewhere in an agricultural field where they will cause a problem for another piece of equipment at a later time. Another effect is that the accumulated material may interfere with the normal operation of the ground engaging member, such as a planter row unit.

Currently, a human operator visually monitors for trash build up. If material is identified by the operator, the operator may have to stop the vehicle and manually remove the trash. Manual removal is time consuming and less acceptable for autonomous machinery where one person may need to monitor and mitigate for several machines, possibly from a location some distance from the work site.

Thus, the different illustrative embodiments provide a method and apparatus for monitoring movement of a vehicle system. A sensor system monitors movement of a structure relative to a vehicle using a sensor system. The structure is connected to the vehicle in the vehicle system. A computer system identifies a number of distances from the sensor system associated with the vehicle to a number of objects associated with the structure. The computer system identifies an orientation of the structure relative to the vehicle using the number of distances from the sensor system associated with the vehicle to the number of objects. The computer system determines whether the orientation of the structure meets a number of criteria. The computer system initiates an operation for the vehicle system in response to an absence of a determination that the orientation meets the number of criteria.

Thus, the different illustrative embodiments provide an apparatus and method for managing undesired material in an area. A sensor system monitors the area for the undesired material using a sensor system. A number of operations is performed on the area using a vehicle system. The vehicle system comprises a vehicle and a structure connected to the vehicle. A computer system receives data for the area from the sensor system. The computer system identifies a presence of the undesired material along a number of paths in the area using the data to form an identification. The computer system generates a signal to initiate removal of the undesired material based on the identification.

Figure 2:
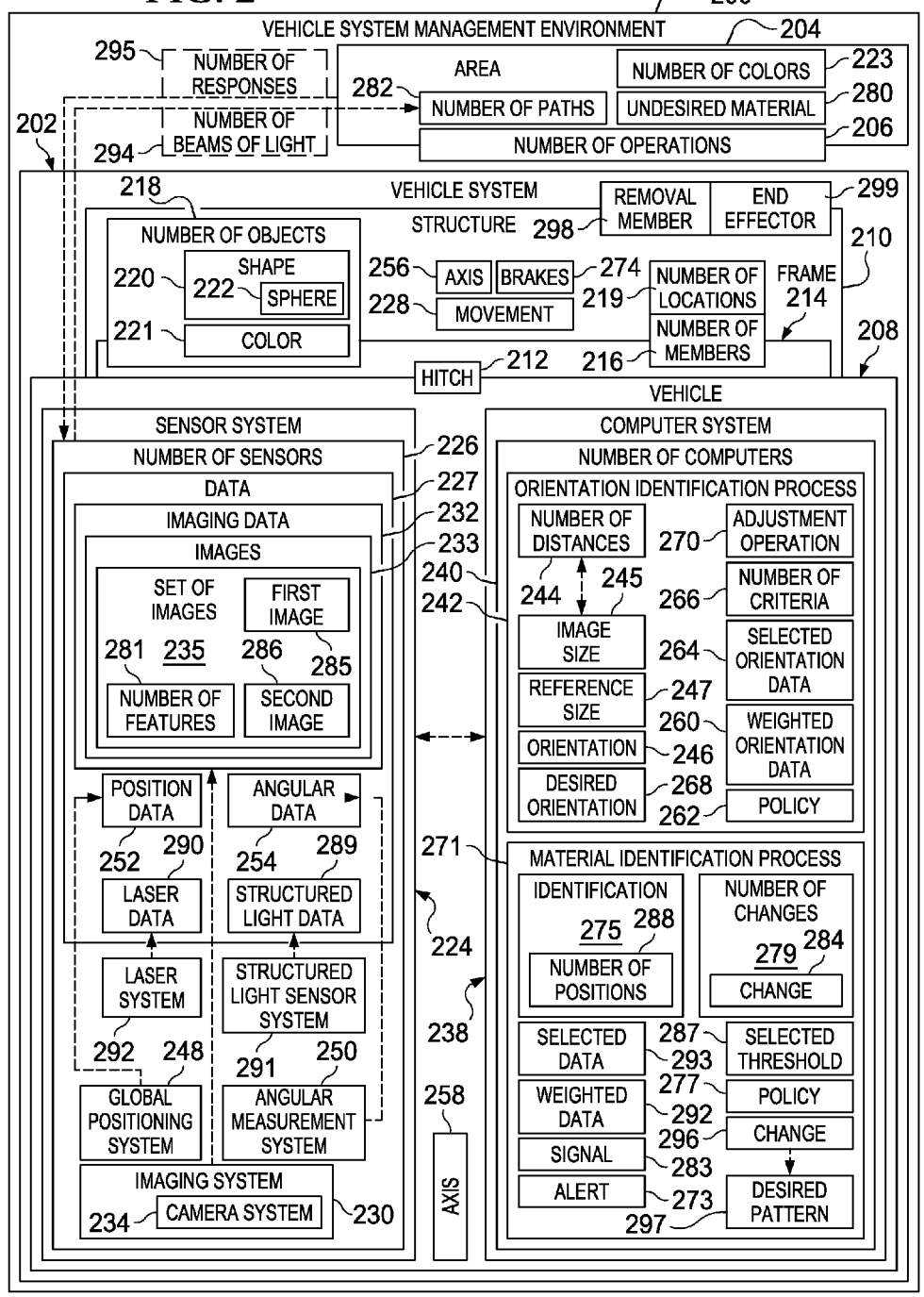
FIG. 2 is an illustration of vehicle system management environment depicted in accordance with an illustrative embodiment.

With reference now to FIG. 2, an illustration of vehicle system management environment is depicted in accordance with an illustrative embodiment. Vehicle system management environment 100 in FIG. 1 is an example of one implementation for vehicle system management environment 200 in FIG. 2.

In this illustrative example, vehicle system management environment 200 includes vehicle system 202 and area 204. Area 204 may be, for example, a field, a hill, an area of land, or some other suitable type of area. Vehicle system 202 performs number of operations 206 on area 204. Number of operations 206 may include, for example, without limitation, tilling, dragging, plowing, planting, seeding, sweeping, and/or other suitable operations.

As illustrated, vehicle system 202 includes vehicle 208 and structure 210 connected to vehicle 208. Vehicle 208 is a ground vehicle in these illustrative examples. As depicted in these examples, structure 210 is connected to vehicle 208 using, for example, hitch 212 for vehicle 208. In particular, frame 214 for structure 210 may be connected to hitch 212 for vehicle 208. Of course, in other illustrative examples, structure 210 may be connected to vehicle 208 in some other suitable manner.

Structure 210 may take a number of different forms. For example, without limitation, structure 210 may be a tilling system, a plowing system, a planting system, a seeding system, and/or some other suitable system configured to perform number of operations 206.

In these depicted examples, structure 210 includes number of members 216. Number of members 216 is attached to frame 214 of structure 210 in these examples. Number of members 216 is configured to perform number of operations 206 on area 204. For example, when structure 210 is a tilling system, number of members 216 is a number of tines configured to till the soil in area 204.

Additionally, number of objects 218 is associated with structure 210. For example, number of objects 218 may be connected to frame 214 of structure 210 at number of locations 219 on structure 210. Number of objects 218 has shape 220. Shape 220 is sphere 222 in these illustrative examples. In other illustrative examples, shape 220 may be selected from a group comprising, without limitation, a cube, a cuboid, a pyramid, a cone, a prism, a cylinder, a polyhedron, or some other suitable shape.

Further, each of number of objects 218 has color 221. Color 221 may be the same or different for each of number of objects 218. Color 221 is selected such that color 221 contrasts with number of colors 223 for area 204.

In some illustrative examples, number of objects 218 may be selected from objects such as, for example, wheels on structure 210. Further, any other type of object attached to or part of structure 210 may be an object in number of objects 218.

As depicted, sensor system 224 is associated with vehicle 208. Sensor system 224 comprises number of sensors 226 configured to generate data 227. In these illustrative examples, number of sensors 226 is configured to monitor movement of vehicle system 202. In particular, number of sensors 226 is configured to monitor movement 228 of structure 210 relative to vehicle 208.

In these illustrative examples, number of sensors 226 includes imaging system 230. Imaging system 230 generates imaging data 232. Imaging system 230 may include, for example, camera system 234 and/or some other suitable type of system configured to generate imaging data 232. Camera system 234 may include, for example, an infrared camera, a visible camera, a video camera, and/or some other suitable type of camera. When imaging system 230 is a camera system 234, imaging data 232 includes images 233. Images 233 may comprise still images and/or a video stream. Imaging system 230 sends imaging data 232 to computer system 238 for processing.

Computer system 238 comprises number of computers 240 in these examples. In these illustrative examples, number of computers 240 may be associated with vehicle 208 and/or structure 210. Orientation identification process 242 runs on number of computers 240. Orientation identification process 242 uses imaging data 232 to identify number of distances 244 from imaging system 230 to number of objects 218 associated with structure 210.

In these illustrative examples, orientation identification process 242 identifies number of distances 244 by identifying change in image size 245 for each of number of objects 218 in images 233. Image size 245 is the size that each of the number of objects 218 appears in the image. The actual size of each of the number of objects 218 does not change, but image size 245 changes due to the distance that each of the number of objects 218 is from imaging system 230. For example, as structure 210 moves relative to vehicle 208, images 233 generated by imaging system 230 indicate change in image size 245 for each of number of objects 218 relative to reference size 247 for each of number of objects 218.

In some illustrative examples, reference size 247 for each of number of objects 218 may be the size for each of number of objects 218 in an initial image in images 233. In other illustrative examples, reference size 247 for each of number of objects 218 may be the size of each of number of objects 218 in a previous image in images 233. In these other illustrative examples, change in image size 245 is the change in size from a previous image to a current image. In these depicted examples, change in image size 245 may be no change or a change.

Further, orientation identification process 242 identifies orientation 246 of structure 210 relative to vehicle 208 using number of distances 244. In these examples, orientation 246 is the orientation of structure 210 in three axes relative to vehicle 208. These three axes may be, for example, an x-axis, a y-axis, and a z-axis.

Additionally, in some illustrative examples, orientation identification process 242 may use other types of data to identify orientation 246 of structure 210 relative to vehicle

208. For example, number of sensors 226 may also include at least one of global positioning system 248, angular measurement system 250, and other suitable sensors in addition to imaging system 230.

Global positioning system 248 generates position data 252 for vehicle system 202. For example, global positioning system 248 may include a number of global positioning system units configured to generate position data 252 for vehicle 208 and structure 210.

Angular measurement system 250 generates angular data 254. Angular data 254 includes a measurement of the angle formed with respect to axis 256 through structure 210 and axis 258 through vehicle 208. In these examples, axis 256 is a centerline axis through structure 210, and axis 258 is a centerline axis through vehicle 208.

Position data 252 and/or angular data 254 are sent to computer system 238 for processing. When orientation identification process 242 receives imaging data 232, position data 252, and angular data 254, orientation identification process 242 may apply weighting factors to the data to form weighted orientation data 260. In other words, imaging data 232, position data 252, and angular data 254 are weighted relative to each other to form weighted orientation data 260. Orientation identification process 242 may use weighed orientation data 260 to identify orientation 246.

In other illustrative examples, orientation identification process 242 uses policy 262 to select at least one of imaging data 232, position data 252, and angular data 254 to form selected orientation data 264. Orientation identification process 242 uses selected orientation data 264 to identify orientation 246.

In these depicted examples, policy 262 may include, for example, a number of rules for determining whether the data generated by imaging system 230, global positioning system 248, and/or angular measurement system 250 is valid. For example, policy 262 may include a number of rules for determining whether imaging data 232, position data 252, and/or angular data 254 is within a selected range of values indicating an error. In this manner, orientation identification process 242 selects which data is used to identify orientation 246.

In these illustrative examples, orientation identification process 242 determines whether orientation 246 of structure 210 relative to vehicle 208 meets number of criteria 266. Number of criteria 266 may, for example, identify a selected tolerance from desired orientation 268 for structure 210 relative to vehicle 208. In this manner, orientation identification process 242 determines whether orientation 246 is within a selected tolerance from desired orientation 268 for structure 210 relative to vehicle 208.

If orientation identification process 242 determines that orientation 246 does not meet number of criteria 266, orientation identification process 242 initiates adjustment operation 270. Adjustment operation 270 is an operation to adjust orientation 246 of structure 210 relative to vehicle 208. For example, adjustment operation 270 may include controlling movement 228 of vehicle 208, controlling movement 228 of structure 210 relative to vehicle 208, generating an alert to an operator of vehicle 208, and/or some other suitable type of operation. The alert may be a display configured to guide the operator to steer vehicle 208 in a desirable manner to correct orientation 246 to desired orientation 268.

As one illustrative example, controlling movement 228 of structure 210 relative to vehicle 208 may include at least one of applying brakes 274 for structure 210, driving wheels of structure 210 using a differential, changing a configuration of structure 210, and some other suitable operation. A differential may allow the wheels of structure 210 to be rotated at different speeds.

Additionally, in these illustrative examples, sensor system 224 is used to monitor area 204 for undesired material 280. Undesired material 280 is material in area 204 that may interfere with number of operations 206 being performed on area 204. For example, without limitation, undesired material 280 may be rocks, branches, weeds, straw, stalks, leaves, bark such as eucalyptus bark, twine, irrigation drip tape, plastic, trash, and/or other types of objects. In these illustrative examples, undesired material 280 may build up underneath structure 210. Structure 210 may be towed equipment, such as farm equipment.

In these depicted examples, sensor system 224 monitors area 204 for undesired material 280 along number of paths 282 in area 204. As illustrated, structure 210 travels along number of paths 282 in area 204. In particular, number of members 216 for structure 210 travels along number of paths 282.

In these illustrative examples, number of paths 282 may include different portions of area 204. For example, number of paths 282 may include the portion of the ground for area 204 that is directly under structure 210 or that will be under structure 210 based on a direction of movement for vehicle system 202 or a selected path of movement for vehicle system 202. Further, in other illustrative examples, number of paths 282 may include portions of the ground for area 204 that are or will be directly under number of members 216 and/or in between number of members 216.

In still other illustrative examples, number of paths 282 may include portions of the ground for area 204 that are or will be within a selected distance from structure 210. In particular, number of paths 282 may include portions of the ground for area 204 that are or will be within a selected distance from number of members 216 for structure 210.

As illustrated, material identification process 271 runs on number of computers 240. Material identification process 271 identifies a presence of undesired material 280 along number of paths 282 in area 204 using, for example, without limitation, imaging data 232, to form identification 275. For example, material identification process 271 may identify number of changes 279 in number of features 281 between set of images 235 in images 233. Number of features 281 comprises at least one of color, texture, size, shape, intensity, and other suitable features.

Material identification process 271 identifies the presence of undesired material 280 along number of paths 282 when change 284 in number of changes 279 in number of features 281 between first image 285 in images 233 and second image 286 in images 233 is greater than selected threshold 287.

In these illustrative examples, identification 275 includes number of positions 288 for undesired material 280 along number of paths 282 in area 204. Material identification process 271 identifies number of positions 288 using imaging data 232 and number of locations 219 for number of objects 218. For example, material identification process 271 may interpolate number of positions 288 using imaging data 232 and number of locations 219 for number of objects 218.

In these depicted examples, material identification process 271 may also form identification 275 using structured light data 289 and/or laser data 290 in data 227. Structured light data 289 is generated using structured light sensor system 291 in sensor system 224. Laser data 290 is generated using laser system 292 in sensor system 224. Laser system 292 may be, for example, a light detection and ranging (LIDAR) system or some other suitable type of laser system. For example, material identification process 271 may receive at least one of imaging data 232, structured light data 289, and laser data 290.

In some illustrative examples, material identification process 271 selects at least one of imaging data 232, structured light data 289, and laser data 290 in data 227 using policy 277 to form selected data 293. Material identification process 271 then uses selected data 293 to identify the presence of undesired material 280 and/or number of positions 288.

In other illustrative examples, material identification process 271 applies weighting factors to data 227 received by material identification process 271 to form weighted data 292. Material identification process 271 then uses weighted data 292 to identify the presence of undesired material 280 and/or number of positions 288. Weighting factors may be used, for example, without limitation, to discard data 227 from sensor system 224 due to a malfunction or a temporary accuracy issue related to the operating environment of sensor system 224. Weighting factors may be used to reduce the significance of data 227 from a generally less accurate sensor. The use of multiple sensors enables fault tolerance which is desirable for autonomous machine operation and robust operation across diverse work sites.

As illustrated in these examples, structured light sensor system 291 and laser system 292 are configured to direct number of beams of light 294 across number of paths 282 in area 204. Further, structured light sensor system 291 and laser system 292 are configured to receive number of responses 295 to number of beams of light 294. Material identification process 271 identifies the presence of undesired material 280 by identifying change 296 in desired pattern 297 for number of responses 295. Change 296 indicates the presence of undesired material 280.

In these depicted examples, in response to identifying the presence of undesired material 280 at number of positions 288 along number of paths 282 in area 204, material identification process 271 generates signal 283 to initiate the removal of undesired material 280 based on identification 275. Also, material identification process 271 initiates the removal of undesired material 280 based on signal 283. For example, material identification process 271 may send a command to removal member 298 associated with structure 210. Also, for example, material identification process 271 may generate alert 273 based on signal 283. Alert 273 may indicate to an operator of vehicle 208 the presence of and number of positions 288 of undesired material 280.

Removal member 298 is configured to remove undesired material 280 from number of positions 288. As one illustrative example, removal member 298 may move to number of positions 288 by moving along a rail system. For example, removal member 298 may be a mechanical arm that sweeps across number of positions 288 along number of paths 282 to remove undesired material 280.

In some illustrative examples, removal member 298 may have end effector 299 connected to removal member 298. End effector 299 may be configured to change a size of undesired material 280. For example, end effector 299 may be a cutting system comprising, without limitation, knives, scissors, blades, rotating blades, sharp edges, lasers, and/or other suitable objects capable of cutting.

It is recognized that sensor system 224 may be used concurrently for both orientation identification process 242 and material identification process 271. Additionally, number of objects 218 may be used for both orientation identification process 242 and material identification process 271.

The illustration of vehicle system management environment 200 in FIG. 2 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative examples, material identification process 271 may not be present. In other illustrative examples, orientation identification process 242 may not be present. Further, in other illustrative examples, material identification process 271 and orientation identification process 242 may be configured to control other structures in addition to structure 210. Additionally, computer system 238 may be located in a control station and configured to control additional vehicle systems in addition vehicle system 202.

Figure 3:
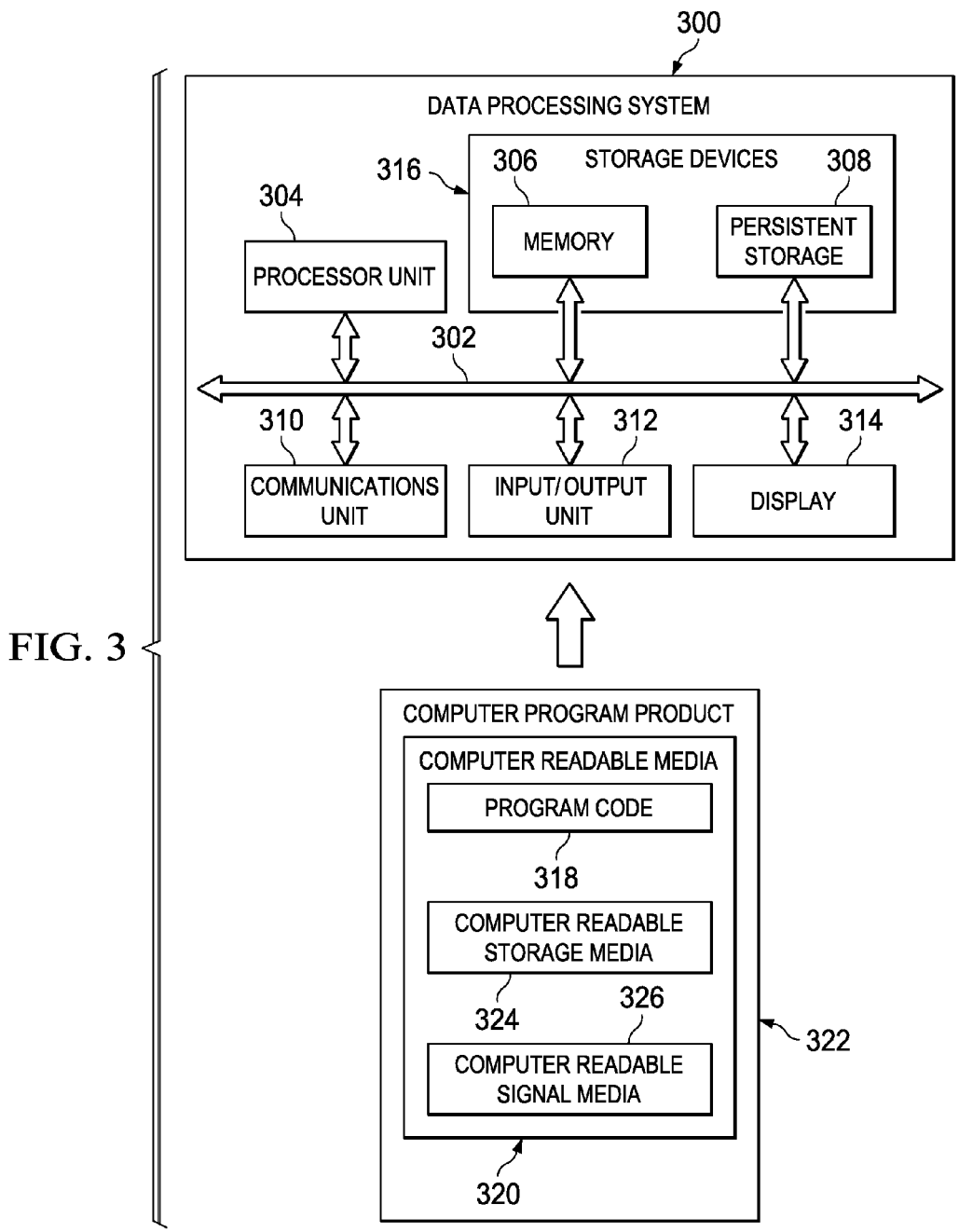
FIG. 3 is a block diagram of a data processing system depicted in accordance with an illustrative embodiment.

With reference now to FIG. 3, a block diagram of a data processing system is depicted in accordance with an illustrative embodiment. Data processing system 300 is an example of one implementation for a computer in number of computers 240 in computer system 238 in FIG. 2. Data processing system 300 is a computer in which computer usable program code or instructions implementing the processes may be located for the illustrative embodiments.

In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multiprocessor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example without limitation, data, program code in functional form, and/or other suitable information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be computer readable storage media 324 or computer readable signal media 326. Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory, that is connected to data processing system 300. In some instances, computer readable storage media 324 may not be removable from data processing system 300.

Alternatively, program code 318 may be transferred to data processing system 300 from computer readable media 320 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 318 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308 and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 4:
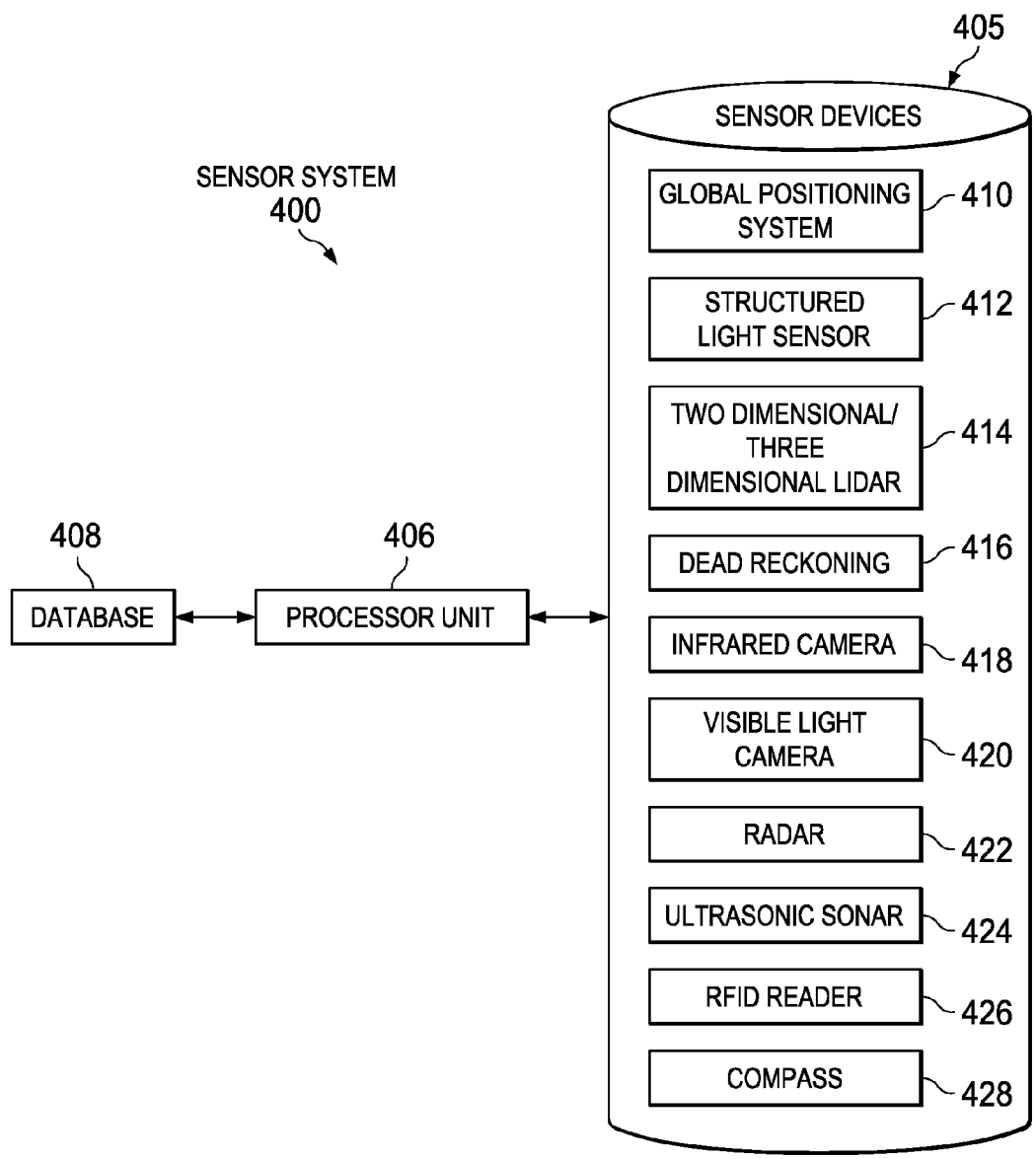
FIG. 4 is an illustration of a sensor system depicted in accordance with an illustrative embodiment.

With reference now to FIG. 4, an illustration of a sensor system is depicted in accordance with an illustrative embodiment. Sensor system 400 is an example of one implementation for sensor system 224 in FIG. 2. Sensor system 400 includes sensor devices 405, processor unit 406, and database 408. Processor unit 406 may be implemented using, for example, data processing system 300 in FIG. 3.

In this illustrative example, sensor devices 405 are examples of implementations for sensors in number of sensors 226 in FIG. 2. Sensor devices 405 may include for example, global positioning system 410, structured light sensor 412, two dimensional/three dimensional laser detection and ranging (LIDAR) system 414, dead reckoning 416, infrared camera 418, visible light camera 420, radar 422, ultrasonic sonar 424, radio frequency identification reader 426, and compass 428. Compass 428 may be an electronic compass.

Sensor devices 405 in sensor system 400 may be selected such that one of the sensors is always capable of generating sensor data needed to operate a vehicle system, such as vehicle system 202 in FIG. 2.

Global positioning system 410 may identify the location of the vehicle with respect to other objects and/or obstacles in the environment. Structured light sensor 412 emits light in a pattern, such as one or more lines, reads back the reflections of light through a camera, and interprets the reflections to detect and measure obstacles in the environment.

Two dimensional/three dimensional laser detection and ranging (LIDAR) system 414 is an optical remote sensor technology that measures properties of scattered light to find range and/or other information of a distant target. Dead reckoning 416 begins with a known position, which is then advanced, mathematically or directly, based upon known speed, elapsed time, and course. Infrared camera 418 detects heat indicative of a living thing versus an inanimate object. Visible light camera 420 may be a standard still-image camera, which may be used alone for color information or with a second camera to generate stereoscopic or three-dimensional images.

Radar 422 uses electromagnetic waves to identify the range, altitude, direction, or speed of both moving and fixed obstacles. Ultrasonic sonar 424 uses sound propagation on an ultrasonic frequency to measure the distance to an obstacle by measuring the time from transmission of a pulse to reception and converting the measurement into a range using the known speed of sound. Radio frequency identification reader 426 relies on stored data and remotely retrieves the data using devices called radio frequency identification (RFID) tags or transponders.

Sensor system 400 may retrieve data from one or more of sensor devices 405 to obtain different perspectives of the area in which the vehicle system is operating. For example, sensor system 400 may obtain visual data from visible light camera 420, data about the distance of the vehicle system in relation to obstacles in the environment from two dimensional/three dimensional laser detection and ranging (LIDAR) system 414, and location data of the vehicle system in relation to a map from global positioning system 410.

The illustration of sensor system 400 in FIG. 4 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in one illustrative embodiment, sensor system 400 may not include processor unit 406 and/or database 408. Data may be processed and stored separately from sensor system 400. In another example, processor unit 406 may include a plurality of processor units for processing data received. In other illustrative embodiments, sensor system 400 may include any number of sensor devices 405 working simultaneously.

Figure 5:
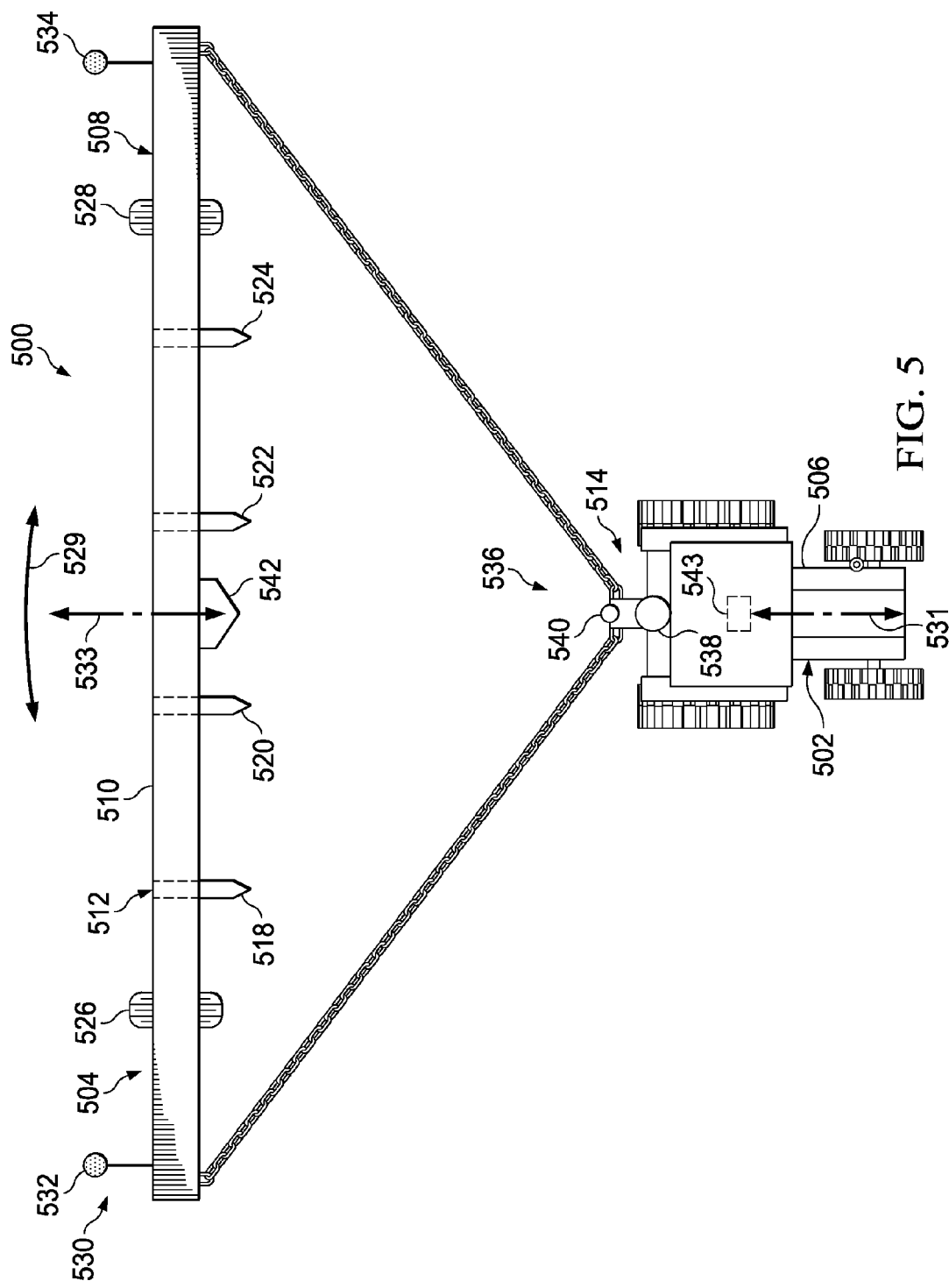
FIG. 5 is an illustration of a vehicle system depicted in accordance with an illustrative embodiment.

With reference now to FIG. 5, an illustration of a vehicle system is depicted in accordance with an illustrative embodiment. In this illustrative example, vehicle system 500 is an example of one implementation for vehicle system 202 in FIG. 2. Further, vehicle system 500 is an example of one implementation for vehicle system 102 in FIG. 1.

As illustrated, vehicle system 500 includes vehicle 502 and structure 504 connected to vehicle 502. Vehicle 502 is tractor 506 in this example. Structure 504, in this example, is tilling system 508. Of course, in other illustrative examples, vehicle 502 and/or structure 504 may take any number of other forms. For example, structure 504 may be a planting or seeding machine.

In this depicted example, structure 504 includes frame 510 and number of members 512 attached to frame 510. Frame 510 of structure 504 is connected to vehicle 502 by hitch 514 for vehicle 502, in this illustrative example. Number of members 512 includes members 518, 520, 522, and 524. Members 518, 520, 522, and 524 are tines in this depicted example.

As illustrated, wheel 526 and wheel 528 are also attached to frame 510. Wheel 526 and wheel 528 allow structure 504 to move relative to vehicle 502. For example, wheel 526 and wheel 528 allow structure 504 to rotate in the direction of arrow 529 about hitch 514 for vehicle 502. In this manner, centerline axis 533 through structure 504 may rotate about hitch 514 in the direction of arrow 529 with respect to centerline axis 531 through vehicle 502.

As illustrated, number of objects 530 is associated with structure 504. In particular, number of objects 530 is connected to structure 504. As depicted, number of objects 530 includes object 532 and object 534. Object 532 and object 534 have a spherical shape in this example. Further, object 532 and object 534 may have a color selected to contrast with the area on which vehicle system 500 moves.

As illustrated, vehicle system 500 has sensor system 536. Sensor system 536 is an example of one implementation for sensor system 224 in FIG. 2. Sensor system 536 includes camera system 538, angle measurement system 540, and global positioning system unit 542. In other illustrative examples, sensor system 536 may also include a structure light sensor system and/or a laser system.

In this illustrative example, camera system 538 generates imaging data, such as imaging data 232 in FIG. 2. For example, camera system 538 generates images which contain number of objects 530. These images may be used to identify the distances between camera system 538 and object 532 and between camera system 538 and object 534. Further, these distances may be used to identify the orientation of structure 504 relative to vehicle 502.

Angle measurement system 540 generates angular data. This angular data may be used to identify the angle with which structure 504 rotates about hitch 514 with respect to vehicle 502. Global positioning system unit 542 generates position and heading data for structure 504 while global positioning system unit 543 generates position and heading data for vehicle 502 in this example.

In this manner, imaging data, angular data, and position data may be used to monitor movement of structure 504 relative to vehicle 502. Further, this data may also be used to identify the presence of undesired material along a number of paths through which vehicle system 500 moves. In some illustrative examples, global positioning system unit 542 and/or angle measurement system 540 may not be included in sensor system 536.

Figure 6:
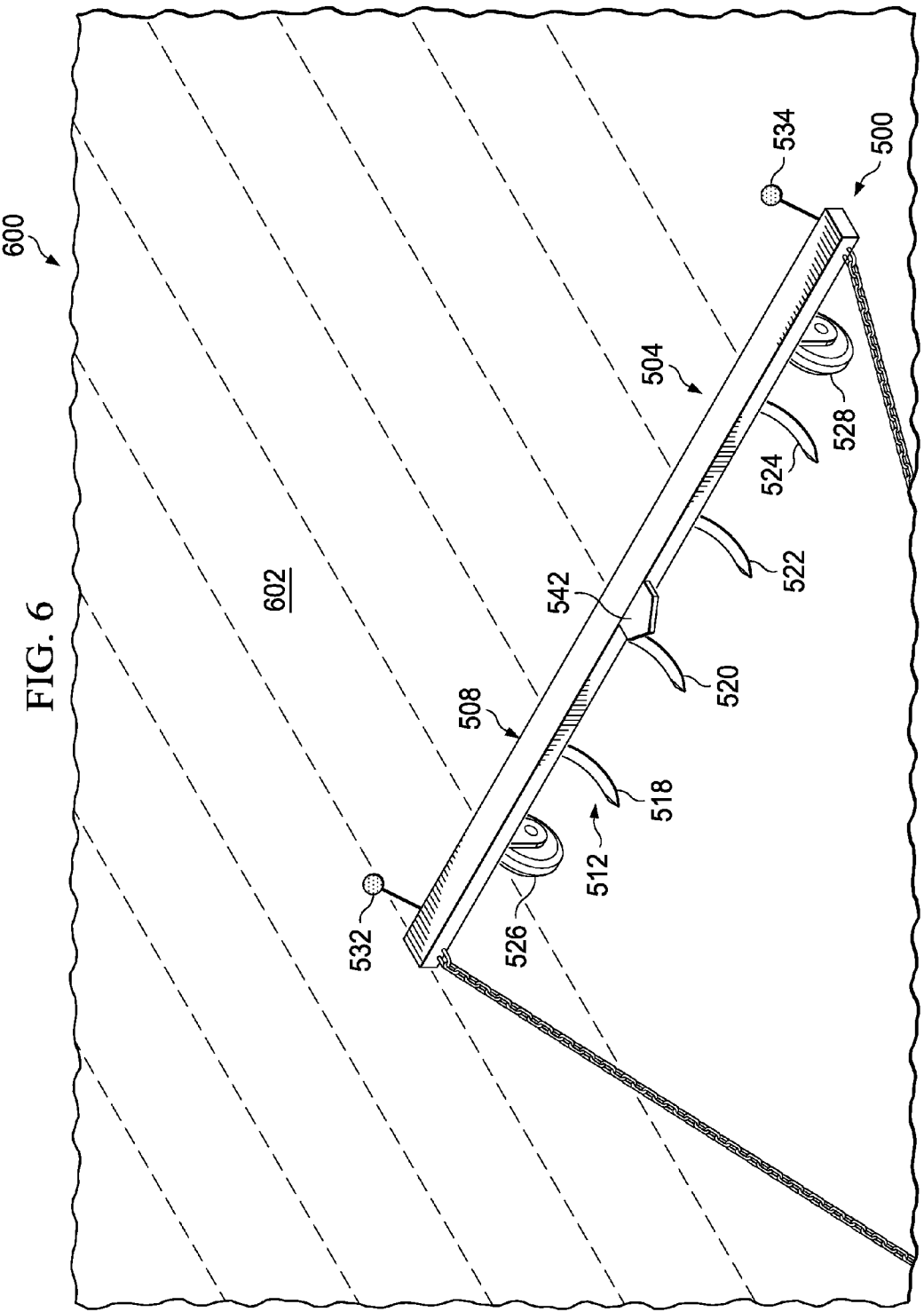
FIG. 6 is an illustration of an image generated using a camera system depicted in accordance with an illustrative embodiment.

With reference now to FIG. 6, an illustration of an image generated using a camera system is depicted in accordance with an illustrative embodiment. In this illustrative example, image 600 is an example of an image generated using camera system 538 in FIG. 5. In particular, image 600 is generated when vehicle system 500 in FIG. 5 is moving in an area, such as field 602.

As illustrated, image 600 includes structure 504. In particular, image 600 includes frame 510, member 518, member 520, member 522, and member 524, wheel 526, wheel 528, object 532, and object 534. As depicted, object 534 has a larger size in image 600 as compared to object 532. This difference in image size may be used to identify a distance from camera system 538 in FIG. 5 to object 532 and a distance from camera system 538 to object 534 using techniques, for example, without limitation, stadiometry. These distances may then be used to identify an orientation of structure 504 relative to vehicle 502 in FIG. 5.

Figure 7:
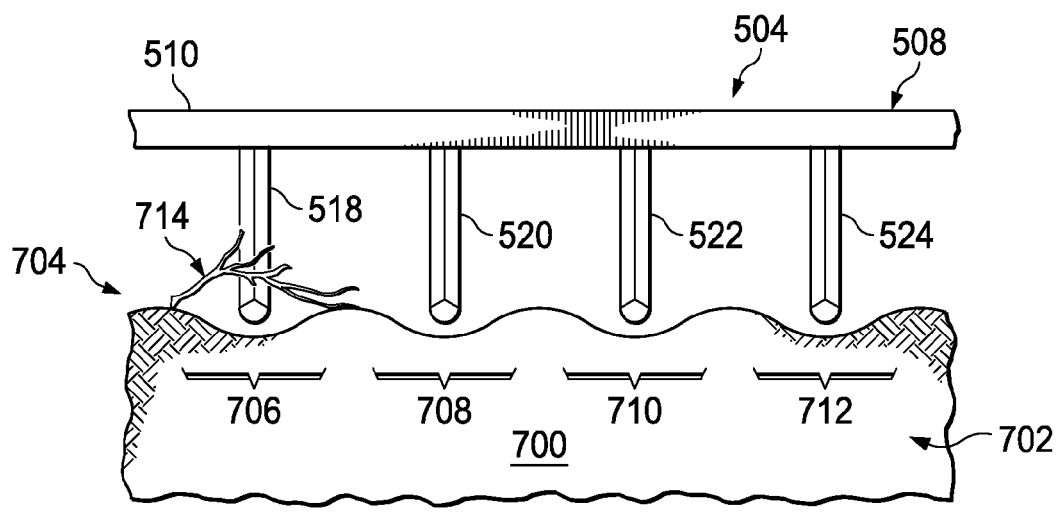
FIG. 7 is an illustration of a structure for a vehicle performing an operation on a ground depicted in accordance with an illustrative embodiment.

With reference now to FIG. 7, an illustration of a structure for a vehicle performing an operation on a ground is depicted in accordance with an illustrative embodiment. In this illustrative example, structure 504 from FIG. 5 is performing a tilling operation on ground 700 in area 702. In particular, number of members 512 performs the tilling operation on ground 700.

In this illustrative example, number of paths 704 is present. Number of paths 704 includes path 706 under member 518, path 708 under member 520, path 710 under member 522, and path 712 under member 524. As depicted, undesired material 714 is present along path 706. The presence of undesired material 714 may be detected using, for example, without limitation, material identification process 271 in FIG. 2. Further, images generated by camera system 538 may be processed by the material identification process to identify the presence of undesired material 714.

Figure 8:
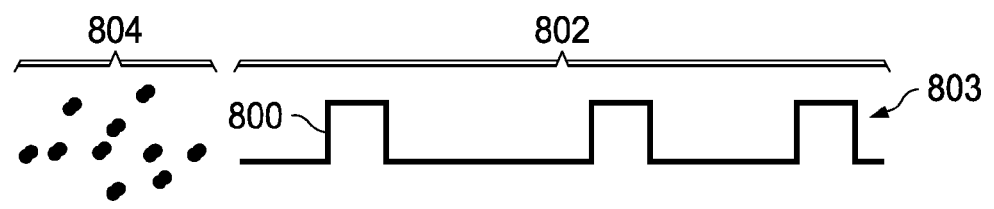
FIG. 8 is an illustration of a response signal received at a structure light sensor system depicted in accordance with an illustrative embodiment.

With reference now to FIG. 8, an illustration of a response signal received at a structure light sensor system is depicted in accordance with an illustrative embodiment. In this illustrative example, response signal 800 is an example of one implementation for a response in number of responses 295 in FIG. 2. In particular, response signal 800 is a response received by, for example, structured light sensor system 291 in FIG. 2.

In this illustrative example, response signal is received in response to the structured light sensor system directing a number of beams of light across number of paths 704 in area 702 in FIG. 7. As depicted, portion 802 of response signal 800 has desired pattern 803. Portion 804 of response signal 800 does not have the desired pattern 803. Portion 804 corresponds to path 706 in FIG. 7 in this depicted example.

Portion 804 of response signal 800 is a change from desired pattern 803. Further, portion 804 of response signal 800 indicates a discontinuity of where light strikes an object. For example, portion 804 indicates that scattered light was detected in response to the number of beams of light being sent across number of paths 704.

A material identification process, such as material identification process 271 in FIG. 2, identifies this change from the desired pattern in portion 804 of response signal 800. This change indicates the presence of undesired material 714 in FIG. 7 along path 706.

Figure 9:
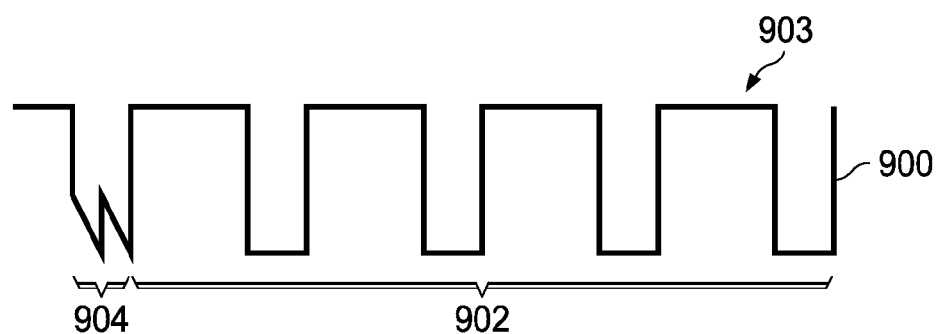
FIG. 9 is an illustration of a response signal received at a laser system depicted in accordance with an illustrative embodiment.

With reference now to FIG. 9, an illustration of a response signal received at a laser system is depicted in accordance with an illustrative embodiment. In this illustrative example, response signal 900 is an example of one implementation for a response in number of responses 295 in FIG. 2. In particular, response signal 900 is a response received by, for example, laser system 292 in FIG. 2.

In this illustrative example, response signal 900 is received in response to the laser system directing a number of beams of light across number of paths 704 in area 702 in FIG. 7. As depicted, portion 902 of response signal 900 has desired pattern 903. Portion 904 of response signal 900 does not have desired pattern 903. Portion 904 corresponds to path 706 in FIG. 7 in this depicted example.

Portion 904 of response signal 900 is a change from desired pattern 903. A material identification process, such as material identification process 271 in FIG. 2, identifies this change from desired pattern 903 in portion 904 of response signal 900. This change indicates the presence of undesired material 714 in FIG. 7 along path 706.

Figure 10:
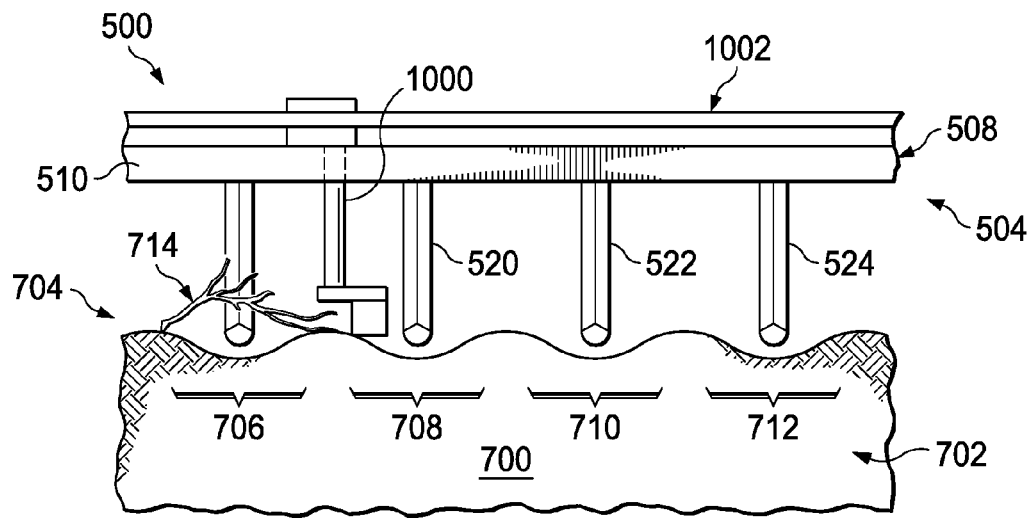
FIG. 10 is an illustration of a removal member connected to a portion of a structure depicted in accordance with an illustrative embodiment.

With reference now to FIG. 10, an illustration of a removal member connected to a portion of a structure is depicted in accordance with an illustrative embodiment. In this illustrative example, removal member 1000 is connected to structure 504 from FIG. 5. Removal member 1000 is a mechanical arm in this illustrative example.

As depicted, removal member 1000 may move along rail system 1002 connected to frame 510 of structure 504. Removal member 1000 moves along rail system 1002 to remove undesired material 714 from path 706. In this manner, undesired material 714 may be removed such that undesired material 714 does not interfere with the tilling operations being performed by structure 504.

Figure 11:
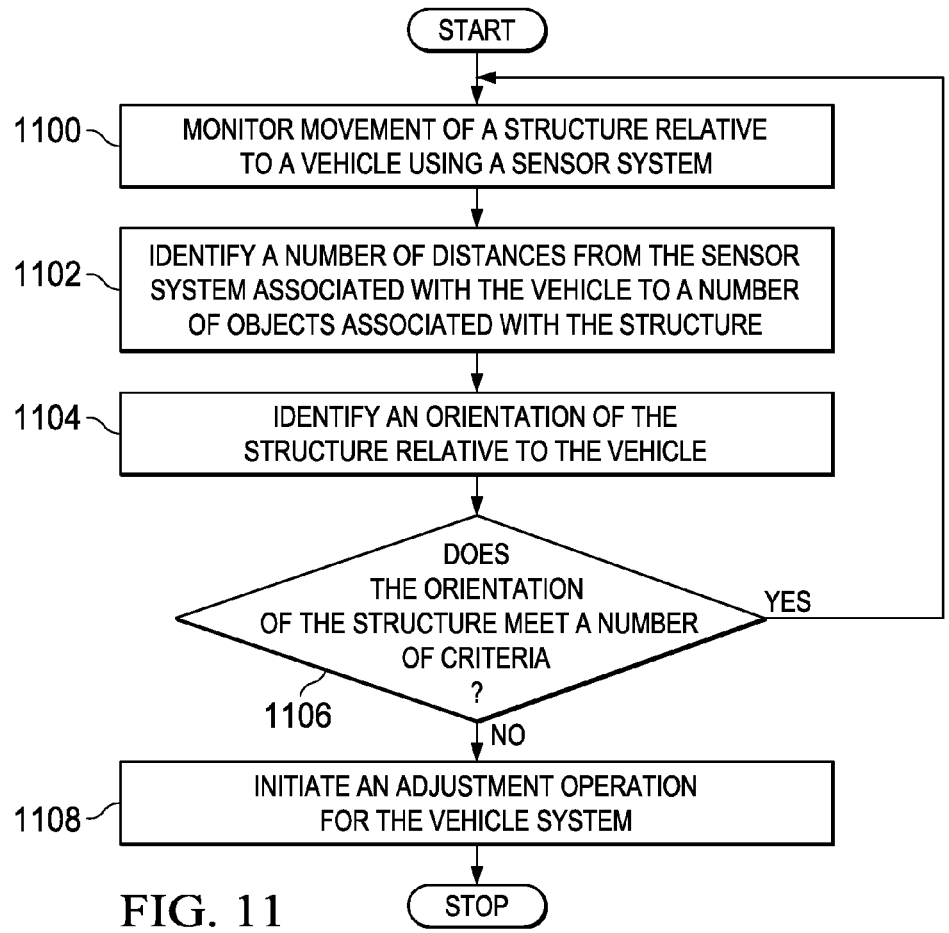
FIG. 11 is an illustration of a flowchart of a process for monitoring movement of a vehicle system depicted in accordance with an illustrative embodiment.

Turning now to FIG. 11, an illustration of a flowchart of a process for monitoring movement of a vehicle system is depicted in accordance with an illustrative embodiment. The process illustrated in FIG. 11 may be implemented in vehicle system management environment 100 in FIG. 1. Further, this process may be implemented using orientation identification process 242 running on computer system 238 in FIG. 2.

The process begins with a sensor system monitoring movement of a structure relative to a vehicle using a sensor system (step 1100). The structure is connected to the vehicle in the vehicle system. A computer system identifies a number of distances from the sensor system associated with the vehicle to a number of objects associated with the structure (step 1102). The number of objects is connected to the structure at a number of locations on the structure. The number of objects has a shape selected from a group comprising a sphere, a cube, a cuboid, a pyramid, a cone, a prism, a cylinder, and a polyhedron.

Next, the computer system identifies an orientation of the structure relative to the vehicle (step 1104). Step 1104 is performed using the number of distances from the sensor system associated with the vehicle to the number of objects. Thereafter, the computer system determines whether the orientation of the structure meets a number of criteria (step 1106). For example, the computer system determines whether the orientation of the structure is within a selected tolerance from a desired orientation.

The computer system then initiates an adjustment operation for the vehicle system in response to an absence of determination that the orientation meets the number of criteria (step 1108), with the process terminating thereafter. In other words, the process initiates an adjustment operation for the vehicle system in response to a determination that the orientation does not meet the number of criteria. In the step 1106, if the orientation meets the number of criteria, the process returns to step 1100.

The adjustment operation is selected from a group comprising at least one of controlling a movement of the vehicle, controlling the movement of the structure relative to the vehicle, and generating an alert. The computer system may control the movement of the structure relative to the vehicle by, for example, without limitation, applying brakes for the structure, changing a configuration of the structure, generating an alert, and/or performing some other suitable operation.

In step 1108, the adjustment operation may be initiated by, for example, identifying the adjustment operation to be performed, sending a command to perform the adjustment operation, performing the adjustment operation, and/or performing some other suitable operation.

Figure 12:
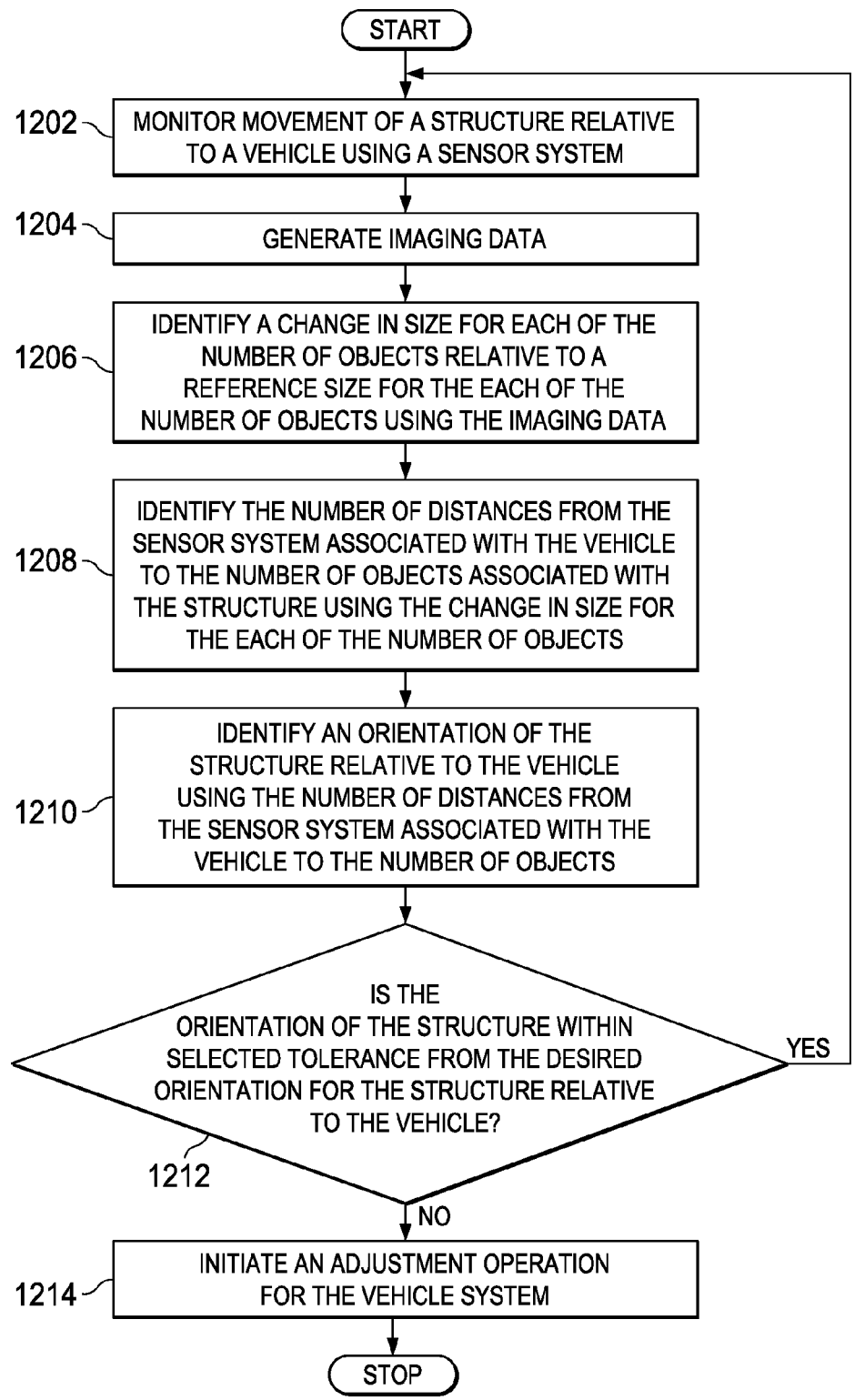
FIG. 12 is an illustration of a flowchart of a process for monitoring movement of a vehicle system depicted in accordance with an illustrative embodiment.

Turning now to FIG. 12, an illustration of a flowchart of a process for monitoring movement of a vehicle system is depicted in accordance with an illustrative embodiment. The process illustrated in FIG. 12 may be implemented in vehicle system management environment 100 in FIG. 1. Further, this process may be implemented using orientation identification process 242 running on computer system 238 in FIG. 2.

The process begins with a sensor system monitoring movement of a structure relative to a vehicle using a sensor system (step 1202). The sensor system generates imaging data (step 1204). This imaging data includes images.

A computer system identifies a change in size for each of the number of objects relative to a reference size for the each of the number of objects using the imaging data (step 1206). The references size may be a previous size for each of the number of objects. The reference size may also be an initial size for each of the number of objects. The initial size may be preloaded into the computer system. In different illustrative embodiments, an operator may set the initial size.

The computer system then identifies the number of distances from the sensor system associated with the vehicle to the number of objects associated with the structure using the change in size for the each of the number of objects (step 1208). Next, the computer system identifies an orientation of the structure relative to the vehicle using the number of distances from the sensor system associated with the vehicle to the number of objects (step 1210).

Thereafter, the computer system determines whether the orientation of the structure is within a selected tolerance from the desired orientation for the structure relative to the vehicle (step 1212). If the orientation of the structure is within the selected tolerance from the desired orientation for the structure relative to the vehicle, the process returns to step 1202 as described above. Otherwise, the computer system initiates an adjustment operation for the vehicle system in response to an absence of determination that the orientation meets the selected tolerance (step 1214), with the process terminating thereafter.

Figure 13:
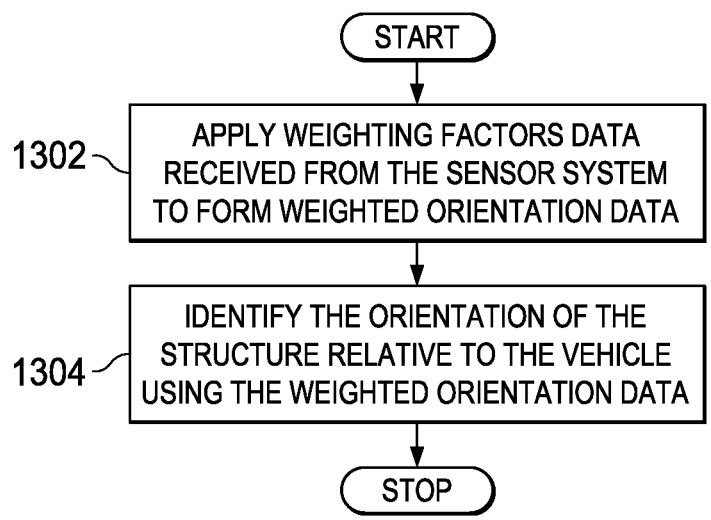
FIG. 13 is an illustration of a flowchart of a process for applying weighting factors depicted in accordance with an illustrative embodiment.

Turning now to FIG. 13, an illustration of a flowchart of a process for applying weighting factors is depicted in accordance with an illustrative embodiment. The process illustrated in FIG. 13 may be a more detailed process for operation 1106 in FIG. 11.

The process begins with a computer system applying weighting factors data received from the sensor system to form weighted orientation data (step 1302). The data received from the sensor system includes at least one of imaging data, position data, and angular data. The imaging data is received from an imaging system in the sensor system. The position data is received from a global positioning system in the sensor system. The angular data may be received from an angular measurement system in the sensor system.

Thereafter, the computer system identifies the orientation of the structure relative to the vehicle using the weighted orientation data (step 1304), with the process terminating thereafter.

Figure 14:
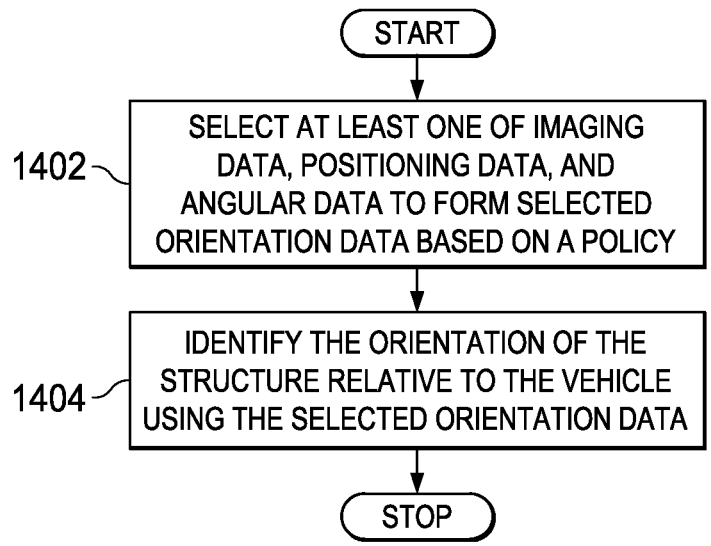
FIG. 14 is an illustration of a flowchart of a process for identifying an orientation of structure based on a policy depicted in accordance with an illustrative embodiment.

Turning now to FIG. 14, an illustration of a flowchart of a process for identifying an orientation of structure based on a policy is depicted in accordance with an illustrative embodiment. The process illustrated in FIG. 14 is a more detailed process for step 1106 in FIG. 11.

The process begins with a computer system selecting at least one of imaging data, positioning data, and angular data to form selected orientation data based on a policy (step 1402). The imaging data is received from an imaging system in the sensor system. The position data is received from a global positioning system in the sensor system. The angular data may be received from an angular measurement system in the sensor system.

The computer system then identifies the orientation of the structure relative to the vehicle using the selected orientation data (step 1404). Thereafter, the process terminates.

Figure 15:
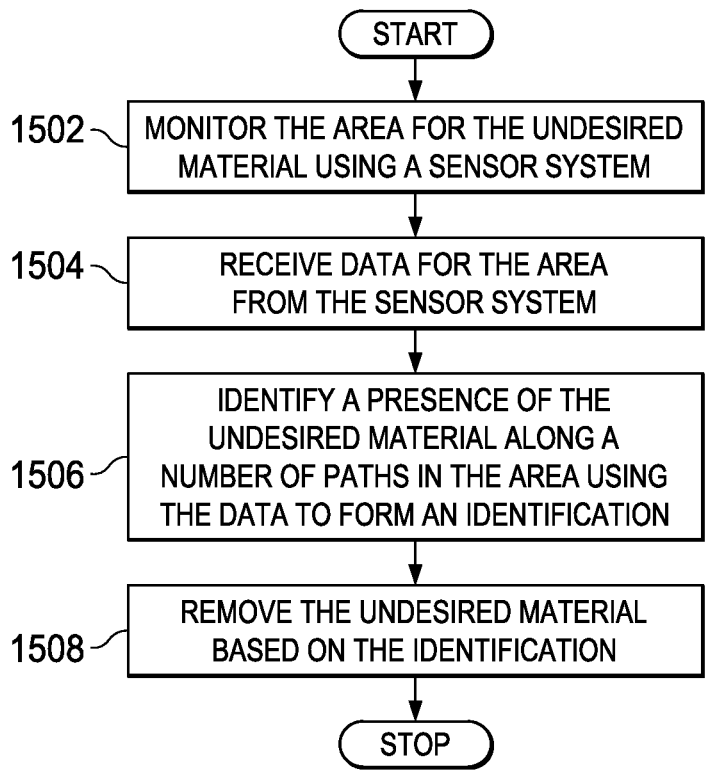
FIG. 15 is an illustration of a flowchart of a process for managing undesired material in an area depicted in accordance with an illustrative embodiment.

Turning now to FIG. 15, an illustration of a flowchart of a process for managing undesired material in an area is depicted in accordance with an illustrative embodiment. The process illustrated in FIG. 15 may be implemented in vehicle system management environment 100 in FIG. 1. Further, this process may be implemented using material identification process 271 running on computer system 238 in FIG. 2.

The process begins with a sensor system monitoring the area for the undesired material (step 1502). The sensor system is associated with a vehicle system. In this illustrative example, step 1502 is performed while a number of operations are performed on the area using a vehicle system. The vehicle system comprises a vehicle and a structure connected to the vehicle. The structure has a number of members configured to perform the number of operations on the area while moving in the area.

Thereafter, the computer system receives data for the area from the sensor system (step 1504). The computer system then identifies a presence of the undesired material along a number of paths in the area using the data to form an identification (step 1506). A removal member removes the undesired material based on the identification (step 1508), with the process terminating thereafter. The removal member is connected to the structure. The removal member may be, for example, a mechanical arm.

Figure 16:
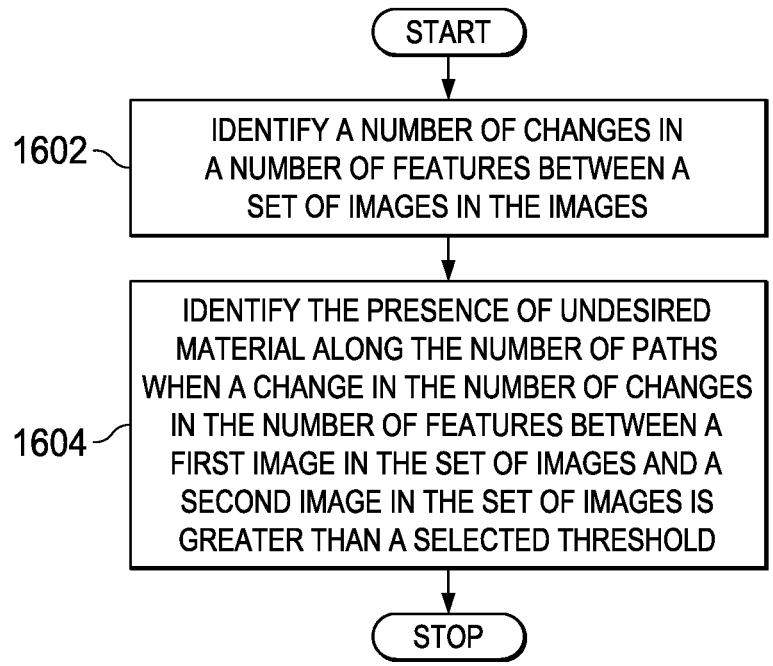
FIG. 16 is an illustration of a flowchart of a process for identifying a presence of undesired material in an area depicted in accordance with an illustrative embodiment.

Turning now to FIG. 16, an illustration of a flowchart of a process for identifying a presence of undesired material in an area is depicted in accordance with an illustrative embodiment. The process illustrated in FIG. 16 is a more detailed process for step 1506 in FIG. 15. Additionally, the data used to perform this process is imaging data, such as imaging data 232 in FIG. 2, generated by an imaging system, such as imaging system 230 in FIG. 2. Further, the imaging data comprises images.

The process begins by identifying a number of changes in a number of features between a set of images in the images (step 1602). The number of features is selected from a group consisting of color, texture, size, intensity, and shape. The computer system identifies the presence of undesired material along the number of paths when a change in the number of changes in the number of features between a first image in the set of images and a second image in the set of images is greater than a selected threshold (step 1604), with the process terminating thereafter.

Figure 17:
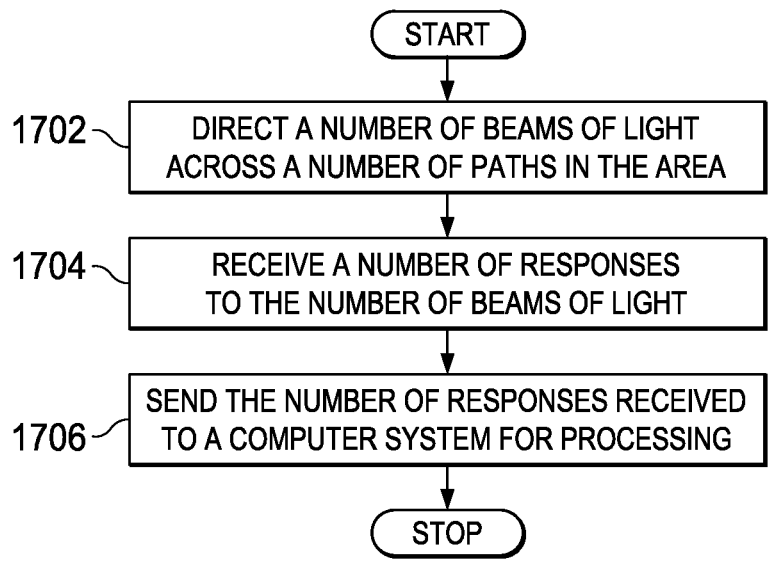
FIG. 17 is an illustration of a flowchart of a process for monitoring an area for undesired material depicted in accordance with an illustrative embodiment.

With reference now to FIG. 17, an illustration of a flowchart of a process for monitoring an area for undesired material is depicted in accordance with an illustrative embodiment. The process illustrated in FIG. 17 is a more detailed process of step 1502 in FIG. 15. Additionally, this process may be implemented using, for example, structured light sensor system 291 in FIG. 2 and/or laser system 292 in FIG. 2.

The process begins by directing a number of beams of light across a number of paths in the area (step 1702). The number of beams of light is emitted by the structured light sensor system or the laser system. Thereafter, the process receives a number of responses to the number of beams of light (step 1704).

The process then sends the number of responses received to a computer system for processing (step 1706), with the process terminating thereafter. In step 1706, the number of responses is sent to, for example, computer system 238 in FIG. 2. In other illustrative examples, the sensor system may process the number of responses and then send the processed data to the computer system.

Figure 18:
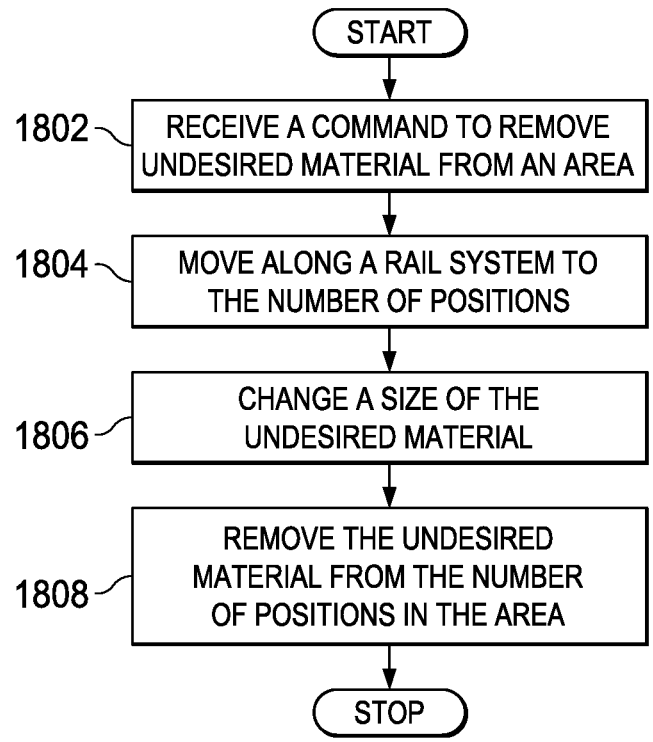
FIG. 18 is an illustration of a flowchart of a process for removing undesired material from an area depicted in accordance with an illustrative embodiment.

With reference now to FIG. 18, an illustration of a flowchart of a process for removing undesired material from an area is depicted in accordance with an illustrative embodiment. The process in FIG. 18 may be implemented using removal member 298 connected to structure 210 in FIG. 2.

The process begins by the removal member receiving a command to remove undesired material from an area (step 1802). The command includes a number of positions for where a presence of undesired material has been identified. This command may be generated during, for example, step 1508 in FIG. 15.

The removal member then moves along a rail system to the number of positions (step 1804). Thereafter, an end effector connected to the removal member changes a size of the undesired material (step 1806). Step 1806 may be performed such that removal of the undesired material is easier with a reduced size for the undesired material. The removal member then removes the undesired material from the number of positions in the area (step 1808), with the process terminating thereafter.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for managing movement of a structure relative to a vehicle to which the structure is connected. A sensor system monitors movement of a structure relative to a vehicle using a sensor system. The structure is connected to the vehicle in the vehicle system. A computer system identifies a number of distances from the sensor system associated with the vehicle to a number of objects associated with the structure. The computer system identifies an orientation of the structure relative to the vehicle using the number of distances from the sensor system associated with the vehicle to the number of objects. The computer system determines whether the orientation of the structure meets a number of criteria. The computer system initiates an operation for the vehicle system in response to an absence of a determination that the orientation meets the number of criteria.

Further, the different illustrative embodiments also provide an apparatus and method for managing undesired material in an area. A sensor system monitors the area for the undesired material using a sensor system. A number of operations is performed on the area using a vehicle system. The vehicle system comprises a vehicle and a structure connected to the vehicle. A computer system receives data for the area from the sensor system. The computer system identifies a presence of the undesired material along a number of paths in the area using the data to form an identification. A removal member removes the undesired material based on the identification.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for managing undesired material in an area, the method comprising:
    monitoring the area for the undesired material using a sensor system, wherein a number of operations is performed on the area using a vehicle system, wherein the vehicle system comprises a vehicle and a structure connected to and pulled by the vehicle;
    receiving data for the area from the sensor system;
    identifying a presence of the undesired material along a number of paths in the area using the data to form an identification, wherein the number of paths are concurrently formed by the structure when pulled by the vehicle; and
    initiating removal of the undesired material based on the identification.

2. The method of claim 1, wherein the step of initiating the removal of the undesired material based on the identification comprises:
    sending a signal to a plurality of removal members attached to the structure to remove the undesired material.

3. The method of claim 2, wherein the step of identifying the presence of the undesired material along the number of paths in the area using the data to form the identification comprises:
    identifying the presence of the undesired material along the number paths in the area using the data to form the identification, wherein the identification includes a number of positions for the undesired material along the number of paths in the area.

4. The method of claim 3, wherein the signal includes the number of positions for the undesired material along the number of paths in the area, and further comprising a step of:
    locating the number of removal members along the structure based on the number of positions for the undesired material.

5. The method of claim 4, wherein the step of removing the undesired material based on the signal comprises:
    removing the undesired material from the number of positions in the area using the number of removal members based on the signal.

6. The method of claim 5, wherein the number of removal members is each a mechanical arm.

7. The method of claim 5, wherein the number of removal members is each positioned at a number of locations on the structure.

8. The method of claim 5 further comprising:
    changing a size of the undesired material using an end effecter, wherein the end effecter is connected to a removal member of the number of removal members.

9. The method of claim 5 further comprising:
    moving the number of removal members along a rail system to the number of positions for the undesired material.

10. The method of claim 3 further comprising:
    identifying the number of positions for the undesired material along the number of paths in the area using the data and a number of locations for a number of objects associated with the structure.

11. The method of claim 10, wherein the number of objects has a shape selected from a group consisting of one of a sphere, a cube, a cuboid, a pyramid, a cone, a prism, a cylinder, and a polyhedron.

12. The method of claim 10, wherein each of the number of objects has a color, wherein the color is selected to contrast with a number of colors for the area.

13. The method of claim 1, wherein the step of initiating the removal of the undesired material based on the identification comprises:
  generating an alert indicating that the undesired material is to be removed and then initiating the removal of the undesired material.

14. The method of claim 1, wherein the structure has a number of members configured to perform the number of operations on the area while moving in the area.

15. The method of claim 1, wherein the sensor system comprises an imaging system configured to generate imaging data.

16. The method of claim 15, wherein the imaging data comprises images and wherein the step of identifying the presence of the undesired material along the number of paths in the area using the data to form the identification comprises:
  identifying a number of changes in a number of features between a set of images in the images; and
  identifying the presence of the undesired material along the number of paths in the area when a change in the number of changes in the number of features between a first image in the set of images and a second image in the set of images is greater than a selected threshold.

17. The method of claim 16, wherein the number of features is selected from a group consisting of color, texture, size, intensity, and shape.

18. The method of claim 15, wherein the data comprises at least one of the imaging data, structured light data, and laser data; and wherein the imaging data is generated by the imaging system in the sensor system, the structured light data is generated by a structured light sensor system, and the laser data is generated by a laser system in the sensor system.

19. The method of claim 18, wherein the step of identifying the presence of the undesired material along the number of paths in the area using the data to form the identification comprises:
  selecting at least one of the imaging data, the structured light data, and the laser data using a policy to form selected data; and
  identifying the presence of the undesired material along the number of paths in the area using the selected data to form the identification, wherein the identification includes a number of positions for the undesired material along the number of paths in the area.

20. The method of claim 18, wherein the step of identifying the presence of the undesired material along the number of paths in the area using the data to form the identification comprises:
  applying weighting factors to the at least one of the imaging data, the structured light data, and the laser data to form weighted data; and
  identifying the presence of the undesired material along the number of paths in the area using the weighted data to form the identification, wherein the identification includes a number of positions for the undesired material along the number of paths in the area.

21. The method of claim 18 further comprising:
  directing a number of beams of light across the number of paths in the area; and
  receiving a number of responses to the number of beams of light.

22. The method of claim 21, wherein the step of identifying the presence of the undesired material along the number of paths in the area using the data to form the identification comprises:
  identifying a change in a desired pattern for the number of responses, wherein the change indicates the presence of the undesired material along the number of paths in the area.

23. The method of claim 1, further comprising:
  monitoring movement of the structure relative to the vehicle using the sensor system.

24. The method of claim 23, further comprising:
  identifying a number of distances from the sensor system associated with the vehicle to a number of objects associated with the structure;
  identifying an orientation of the structure relative to the vehicle using the number of distances from the sensor system associated with the vehicle to the number of objects;
  determining whether the orientation of the structure meets a number of criteria; and
  initiating an operation for the vehicle system in response to an absence of a determination that the orientation meets the number of criteria.

25. The method of claim 1, wherein the undesired material comprises at least one of weeds, grass clippings, straw, bark, stalks, leaves, plastic, irrigation drip tape, twine, dirt, rocks, branches or trash.

26. An apparatus comprising:
  a sensor system configured to monitor an area for undesired material, wherein a number of operations is performed on the area using a vehicle system, wherein the vehicle system comprises a vehicle and a structure connected to the vehicle, and wherein the number of operations includes at least one of tilling, sowing and plowing;
  a computer system configured to receive data for the area from the sensor system, identify a presence of the undesired material along a number of paths in the area using the data to form an identification, and initiate removal of the undesired material based on the identification, wherein the number of paths are concurrently formed by the structure when performing the number of operations.

27. The apparatus of claim 26 further comprising:
  a plurality of removal members connected to the structure and configured to remove the undesired material.

28. The apparatus of claim 27, wherein in being configured to identify the presence of the undesired material along the number of paths in the area using the data to form the identification, the computer system is configured to identify the presence of the undesired material along the number paths in the area using the data to form the identification, wherein the identification includes a number of positions for the undesired material along the number of paths in the area.

29. The apparatus of claim 28, wherein the computer system is further configured to send a signal to a number of removal members to remove the undesired material, wherein the signal includes the number of positions for the undesired material along the number of paths in the area, and position the number of removal members along the structure based on the number of positions for the undesired material.

30. The apparatus of claim 29, wherein in being configured to remove the undesired material based on the signal, the number of removal members is configured to remove the undesired material from the number of positions in the area based on the signal.

31. The apparatus of claim 30, wherein the number of removal members is each a mechanical arm.

32. The apparatus of claim 30, wherein the number of removal members is each positioned at a number of locations on the structure.

33. The apparatus of claim 30 further comprising:
an end effecter connected to a removal member of the number of removal members and configured to change a size of the undesired material using the end effecter.

34. The apparatus of claim 30, wherein the removal member is further configured to move the number of removal members along a rail system to the number of positions for the undesired material.

35. The apparatus of claim 28, wherein the computer system is further configured to identify the number of positions for the undesired material along the number of paths in the area using the data and a number of locations for a number of objects associated with the structure.

36. The apparatus of claim 35, wherein the number of objects has a shape selected from a group consisting of one of a sphere, a cube, a cuboid, a pyramid, a cone, a prism, a cylinder, and a polyhedron.

37. The apparatus of claim 35, wherein each of the number of objects has a color, wherein the color is selected to contrast with a number of colors for the area.

38. The apparatus of claim 26, wherein the structure has a number of members configured to perform the number of operations on the area while moving in the area.

39. The apparatus of claim 26, wherein the sensor system comprises an imaging system configured to generate imaging data.

40. The apparatus of claim 39, wherein the imaging data comprises images and wherein in being configured to identify the presence of the undesired material along the number of paths in the area using the data to form the identification, the computer system is configured to identify a number of changes in a number of features between a set of images in the images; and identify the presence of the undesired material along the number of paths in the area when a change in the number of changes in the number of features between a first image in the set of images and a second image in the set of images is greater than a selected threshold.

41. The apparatus of claim 40, wherein the number of features is selected from a group consisting of color, texture, size, intensity, and shape.

42. The apparatus of claim 39, wherein the data comprises at least one of the imaging data, structured light data, and laser data; and wherein the imaging data is generated by the imaging system in the sensor system, the structured light data is generated by a structured light sensor system, and the laser data is generated by a laser system in the sensor system.

43. The apparatus of claim 42, wherein in being configured to identify the presence of the undesired material along the number of paths in the area using the data to form the identification, the computer system is configured to select at least one of the imaging data, the structured light data, and the laser data using a policy to form selected data; and identify the presence of the undesired material along the number of paths in the area using the selected data to form the identification, wherein the identification includes a number of positions for the undesired material along the number of paths in the area.

44. The apparatus of claim 42, wherein in being configured to identify the presence of the undesired material along the number of paths in the area using the data to form the identification, the computer system is configured to apply weighting factors to the at least one of the imaging data, the structured light data, and the laser data to form weighted data; and identify the presence of the undesired material along the number of paths in the area using the weighted data to form the identification, wherein the identification includes a number of positions for the undesired material along the number of paths in the area.

45. The apparatus of claim 42, wherein the sensor system is configured to direct a number of beams of light across the number of paths in the area, and receive a number of responses to the number of beams of light.

46. The apparatus of claim 45, wherein in being configured to identify the presence of the undesired material along the number of paths in the area using the data to form the identification, the computer system is configured to identify a change in a desired pattern for the number of responses, wherein the change indicates the presence of the undesired material along the number of paths in the area.

47. The apparatus of claim 26, wherein the undesired material comprises at least one of weeds, grass clippings, straw, bark, stalks, leaves, plastic, irrigation drip tape, twine, dirt, rocks, branches or trash.

* * * * *